Figure 1:
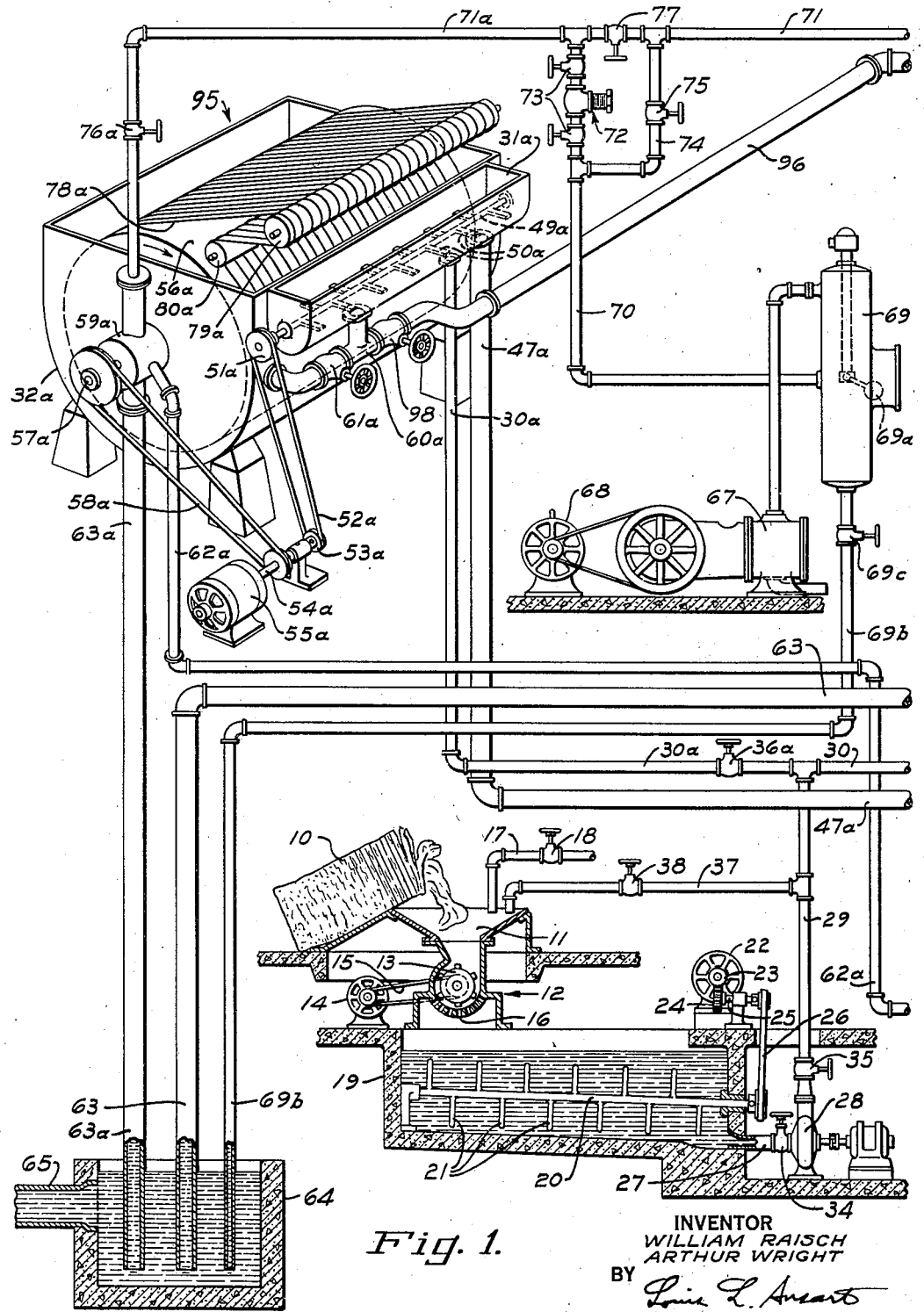

Patented Nov. 28, 1933

1,937,481

UNITED STATES PATENT OFFICE

1,937,481

SEWAGE TREATMENT AND DISPOSAL

William Raisch, Forest Hills, N. Y., and Arthur Wright, Upper Montclair, N. J., assignors, by mesne assignments, to Underpinning & Foundation Company, Inc., New York, N. Y., a corporation of New York Application October 22, 1932. Serial No. 639,024

16 Claims. (Cl. 210—2)

This invention relates to sewage treatment and disposal, and more particularly to refined filtration possessing various advantages not heretofore obtained, including the removal of very fine particles of suspended matter from sewage generally in dilute form and the production of a residue which is stable and may be used as a fertilizer base or, due to its high calorific content, may readily be burned.

An important object of the invention is to provide for obtaining the above mentioned and other desired results in a novel and advantageous manner. Another object of the invention is to provide means for effecting such refined filtration. A further object of the invention is to provide novel and advantageous methods whereby such filtration may be effected. An important feature relates to the formation of a cake of a requisite thickness on a filter, the removal of the cake from the filter and the repeated formation and removal of cakes containing the material of the first cake.

Another important feature relates to the use, in connection with usual sewage solids, of material in the nature of a carrier and capable in connection with said sewage solids of forming on a filter a pulpy mass by which filtration will be facilitated. Without such carrier material, it would, in many cases, be substantially impossible to obtain effective filtration inasmuch as the solids in liquid to be purified, such as sewage, may be insufficient or too oily to build up a suitable filter cake. This condition might exist in sewage after removal of the major solids, comprising, for example, those that can be removed by one or more of the operations of skimming, screening and sedimentation. Although there may sometimes be enough carrier material for the purpose in the sewage received for treatment, this is not usually the case and such material must then be added. Although the carrier material preferably consists of pulp made from waste paper, any suitable cellulose pulp may be used. Other waste material such as fibrous material mixed with liquid may be suitable for this purpose. In the cake thus formed, the binding action may come from the more or less finely divided waste matter or from the sewage solids proper or from both.

It is also an important feature of the invention to produce as a final residue either a cake containing solids, for the removal of which the filtration was effected, and carrier material of high calorific material thereby facilitating burning of the removed cake, or a stable material which will have value as a fertilizer and will be of particular value as a fertilizer base. The stabilization of the raw sewage solids in the partially dried cake, that preferably comprises substantially 50% of sewage residue and 50% of carrier material preferably paper pulp, may be effected by exposure to mold action. It has been found that raw sludge or sewage solids will develop a mold in a few days.

Another feature relates to the addition to sewage usually raw or dilute, of a sufficient amount of the carrier to assure the formation of a cake of requisite thickness to produce effective filtration of the sewage, and to the repeated use of the carrier until exhausted. The sewage is normally very dilute and the amount of sewage solids removed at any time is very small in proportion to the total amount of matter in the cake. Consequently if the carrier material were used only once it would be necessary to use a very large amount thereof and the operation would not be economical. As a result of continuously removing the cake and repulping it with raw sewage on the way to the filter, we avoid obstruction to the flow of liquid through the filter, which obstruction may be caused by formation of a surface layer or film of sewage solids on the cake. The repulping causes the sewage solids to be distributed through the material of the cake and not to collect on the surface of the cake sufficiently to impair materially the filtering action, until the amount of sewage solids in the cake is substantially equal in amount to the carrier. By thus overdosing the sewage stream with a batch of carrier material and using the carrier over and over after repulping, one dose or charge can be made to last for a considerable interval of time such as a day by suitable designing and operation.

Other features of the invention involve the manner in which a vacuum is obtained in vacuum filters used in carrying out the invention. A further feature involves the dual use of a vacuum filter at one time with a relatively low vacuum for ordinary filtration purposes and at another time with a relatively high vacuum for drying the residue. Another feature involves the use of a rotary vacuum filter in which cloudy filtrate or the like obtained in the first part of a filtering zone is drawn off separately from the clearer filtrate drawn off from the rest of the zone. Further features of the invention relate to the means for assuring proper vacuum conditions in the filter units and for regulating the action of one or more filters to use the carrier and associated sewage solids repeatedly or to discharge the cake formed thereof from the filter as soon as the filtrate has been withdrawn therefrom.

According to a preferred manner of carrying out the invention use is made of suitable material, such as waste paper combined with water to form pulp, to assist the action of rotary filters of a type in which the material to be filtered is supplied to a tank containing a rotary drum divided at its periphery into a plurality of chambers covered at their outer sides by filter material, such as filter cloth, or fabric of material in strand form, which may be backed by one or more screens. Pulped paper is especially adapted for this purpose due, for example, to its absorptive properties and its stickiness when wet, which would cause the waste sewage solids to adhere thereto. As the drum of each filter revolves the different chambers will be brought successively into cooperative relation with vacuum means and will be subjected to the resulting vacuum or suction through a considerable angular range.

The filter cake formed of pulp and sewage solids is removed from the filter medium, repulped with additional sewage and returned to the filter; and this action is repeated until the proportion of sewage solids in the cake becomes higher than a predetermined value, above which the cake becomes so slimy as to interfere very materially with the passage of the filtrate. To this end each filter may be provided with a mixing or repulping tank or trough adjacent to the tank of the filter and into which the cake or sheet of material formed on the filter drum is discharged for repulping after the filtering action thereof is completed. The sewage to be filtered is also supplied to the trough of each filter and preferably the trough in each case and the liquid level in the trough are high enough above the level in the filter to cause gravity feed of material from the trough to the tank. The material fed into the repulping trough may be agitated to effect pulping and repulping preferably by a rotary member having projecting arms arranged therearound in such a manner as to tend to feed material from one end to the other of the trough. After repulping the pulpy material is returned to the tank of the filter and used for the same purpose as before.

The vacuum exerted at one or both ends of each of the filters may be produced in any suitable manner but preferably is obtained by means of a barometric leg in which the falling filtrate acts to produce a vacuum inside the filter. In view of the amount of filtrate withdrawn from each filter, the discharged liquid or water constituting the filtrate will serve to produce a vacuum in each drum. It will be seen that this arrangement for producing suction or vacuum will be very effective in action and also economical. Provision may be made to prevent the presence of air in the barometric legs, a condition which would tend to render them ineffective. Such prevention may be effected through the use of means including a suitable vacuum pump.

The material for the pulp, waste paper for example, is preferably disintegrated and mixed with water or other suitable liquid in which the pulp is agitated or beaten and from which it may be forced to the repulping trough of one or more suction filters. Preferably provision is made for recirculating the pulp, that is, again passing it through the shredding and beating devices to reduce the particles of paper or material to the desired degree of fineness.

The sewage to be treated is supplied to a tank or wet well and may be supplied as by pumping to the repulping troughs from which it will pass to the tanks of the corresponding filters and will there be drawn against and through the filter cloth or other filter medium leaving on the surface thereof a cake containing the combined residue and pulp. After being used through a part of one revolution of the filter, this cake will be again discharged into the corresponding repulping trough. Although two rotary filters are here shown, it should be understood that use may be made of a larger number.

In ordinary operation all of the rotary filters are used for low vacuum filtration so that the cake of sewage solids discharged from each rotary member is comparatively soft and watery and can therefore be repulped readily. When the rotary filters have been operated for the predetermined maximum period and the proportion of sewage solids in the mixture of sewage solids and pulp has become substantially as great as is permissible at least one of the filters is worked with a higher vacuum and with a diminished rate of supply of sewage thereto, whereby the solids in the cake will be dewatered or dried to a great extent, and the cake instead of being discharged into the repulping trough is discharged from the filter for disposal in any suitable manner—as by incineration which will be facilitated by the high calorific content of the carrier, or by exposure to mold action to stabilize the cake material. The pulp from all the other filters may be fed, preferably by gravity, to the drying filter or filters and passed therethrough. The apparatus will then be left in condition for another charge of pulp.

The main barometric legs of the various filters may end in a discharge tank from which the filtrate or final affluent may be drawn and may then be sterilized as by chlorination. The separate removal of cloudy filtrate in the first part of each filtering zone may also be effected by barometric legs which discharge the cloudy filtrate into the supply tank from which it will again be passed to the filters with additional sewage for further filtration.

The dewatering by a drying filter may be effected in any suitable manner, preferably however by suitable means such as a vacuum pump arranged so that it can draw a vacuum and a filtrate pump to pull the filtrate through the barometric leg ordinarily used for the preliminary filtration which results in cloudy filtrate. The cake discharged from the drying rotary filter may be discharged directly into a hopper at the top of an incinerator.

Figure 1A:
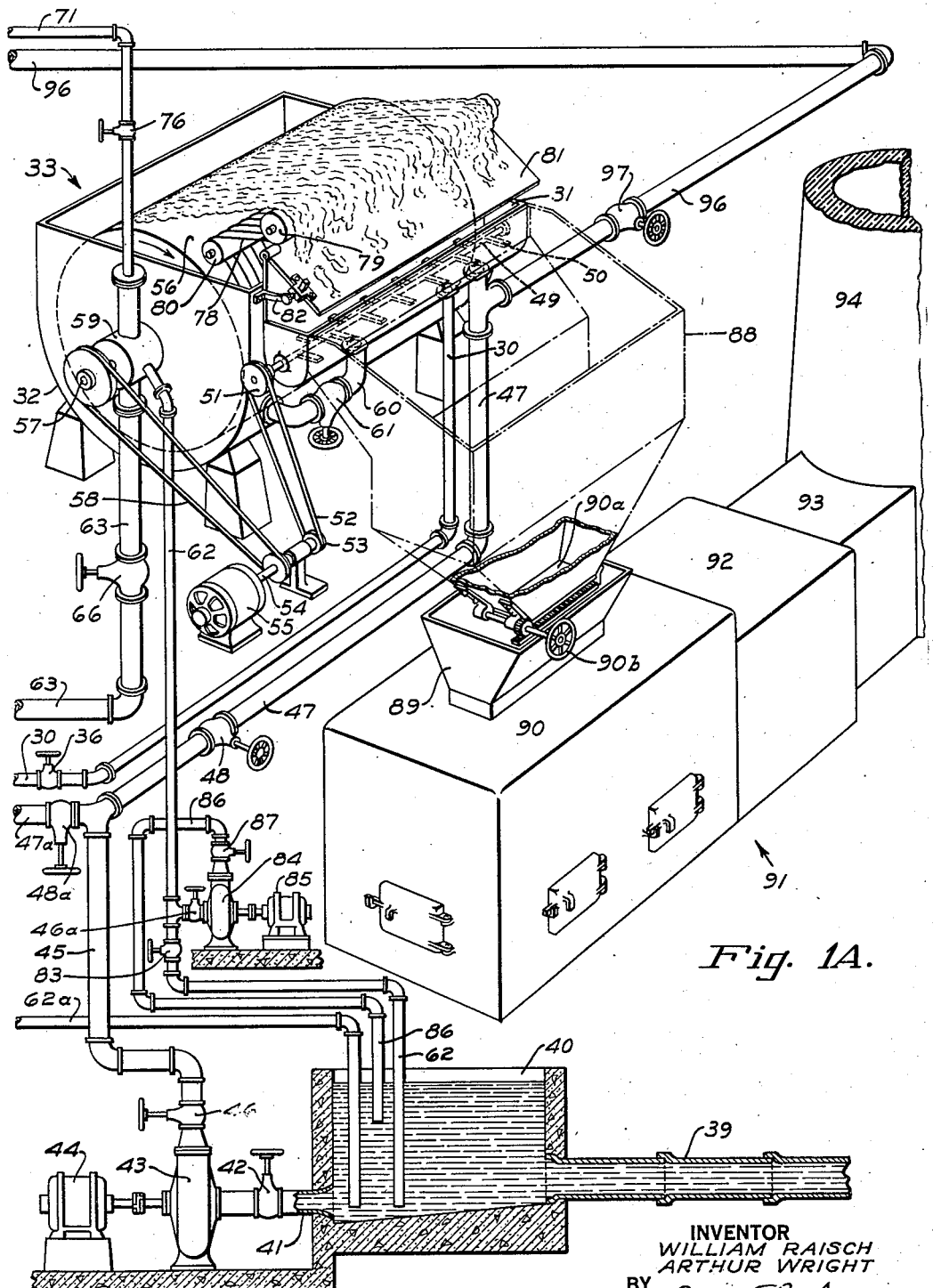

Other objects, features and advantages will appear upon consideration of the following detailed description and of the drawings, in which Fig. 1 is a diagrammatic perspective view of part of the apparatus, and Fig. 1A is a related and similar view showing the rest of the apparatus.

Preferably the carrier of the present invention is formed of waste paper combined with water from the sewage or from a fresh water supply to form pulp. The paper may be supplied in bales 10 and gradually fed into a hopper 11 at the upper part of a shredding device 12 including a rotary shredder 13 driven by a motor 14 and a belt 15 and located above a perforated part or grating 16 at the bottom of the shredding device. During the shredding operation, water may be supplied to the hopper 11 through a pipe or line 17 provided with a valve 18. The shredded paper together with the water will pass downwardly into a beater or agitator tank 19. The supply of water may be continued until the material in the tank 19 reaches the desired level whereupon the valve 18 may be closed.

While in the tank 19 the shredded paper and water may be agitated or beaten by a rotary beater having a shaft 20 and arms 21 thereon, the arms 21 being preferably arranged so as to produce a feeding movement of the pulp. Rotation of the shaft 20 may be effected by means including a motor 22, a worm 23 on the motor shaft, a worm gear 24 on a shaft 25, and a belt 26 connecting pulleys on the two shafts 20 and 25. The shredded paper in pulpy form is gradually carried to a discharge pipe 27. In this connection it may be said that a 4% pulp mixture gives satisfactory results for filtration although the percentage may be varied to a considerable extent.

From the discharge pipe 27 the pulp may be forced by suitable means such as rotary pump 28 through a pipe 29 and a branch pipe 30 to a repulping trough 31 supported at the outside of a tank 32 forming part of a filter 33. Preferably the pipe 30 is connected with the repulping trough 31 at the bottom thereof. The lines 27 and 29 may be provided with valves 34 and 35 to isolate the pump 28 when, for example, the latter is to be repaired or removed. The valve 35 may also be closed to prevent backflow through the pump when it is not in operation. When a suitable amount of pulp has been supplied to the repulping trough 31 the connection between the pump 28 and the trough 31 may be shut off through a valve 36 in the line or pipe 30.

It may be desirable to subject the pulp more than once to the action of the shredder and of the agitator or beater in the combined pulp mixer and storage tank 19. For this purpose the discharge of pulp through the line 29 is prevented by means including the valve 36 and the pulp is forced from the pipe 29 at a point between the pump 28 and the line 30, into a pipe 37 terminating over the hopper 11 of the shredder and controlled by valve 38 which is closed except during this repulping action.

The sewage to be filtered is delivered through a pipe 39 to a wet well or tank 40, of which the floor preferably slopes downwardly toward an outlet 41 which may be controlled by a valve 42. From the outlet 41 the sewage is forced by suitable means, such as a rotary pump 43 driven by a motor 44, upwardly through a pipe or line 45, which may be provided just above the pump 43, with a valve 46, and through a branch line or pipe 47, which may be provided with a valve 48, into the lower part of the repulping trough 31. In the repulping trough 31 is a rotary beater comprising a shaft 49 and arms or paddles 50. The shaft 49 may be driven in any suitable manner, as by means of a pulley 51 thereon connected by means of a belt 52 with a pulley 53 on a shaft 54 of a motor 55.

The filter 33, which as here disclosed is of the same general type as that disclosed in the patent to Wright & Young, No. 1,472,574, granted October 30, 1923, includes a filter drum 56 mounted on a shaft 57 which may be driven from the motor 55 by means of a belt 58 connecting pulleys on the two shafts 54 and 57. The filter drum may be provided at its periphery with a series of chambers or sections (not shown) extending from end to end of the drum and covered by means which may include a filter fabric of the proper character, for example, cloth woven from strands of textile material or from wire or other metallic strands. The various compartments may be connected at one or both ends of the drum with a suction or vacuum valve 59 so constructed that each section as it passes into the liquid in the tank 32 during a clockwise rotation of the drum 56 (Fig. 1A) is subjected to a vacuum to draw filtrate therethrough, this general condition being maintained until the section is about to discharge its cake.

The mixed sewage and pulp in the repulping trough 31 passes therefrom preferably by the action of gravity, through a pipe 60 controlled by valve 61 into the tank 32 of the rotary filter 33. Preferably the drum 56 is maintained about 60% submerged and, due to the relatively high level at which the trough 31 is located and the level at which liquid is maintained therein, the material in the trough will have a gravity feed into the tank 32. The vacuum produced at the valve 59 may be produced in any suitable manner, preferably by a barometric leg 62 connected at its upper end with the valve 59 so as to act on the filter chambers when they first pass into the liquid in the tank 32 and extending at its lower end into the supply tank or wet well 40, and by a barometric leg 63 connected at its upper end with the lower part of the valve 59 so as to act on the various chambers of the filter drum after they leave the zone of influence of the barometric leg 62, and extending at its lower end into a discharge tank 64 from which the filtrate or filtered effluent overflows through a pipe or line 65 leading preferably to sterilizing means where the liquid may be treated as by chlorination. The barometric leg 63 may be provided with a valve 66 for the purpose to be brought out more fully hereinafter.

To prevent the collection in the valve 59 of air which would tend to render the barometric legs 62 and 63 ineffective, provision may be made of any suitable means for removing air which may collect in this way.

Cracking or breaking of the cake may be prevented by a usual pervious band suitably guided so as to hold the cake against the filter medium on the drum. Collection of air in the valve 59 may be prevented by means of a vacuum pump 67 driven by means including a motor 68 and connected through the upper part of a vacuum chamber or tank 69 and through pipes 70 and 71 with the upper part of the valve 59. The vacuum should ordinarily be just sufficient to draw off the air and for this reason provision is made of an adjustable regulator 72 which limits the vacuum effect of the pump 67. Preferably valves 73 are provided at opposite sides of the regulator 72 to shut off the connection therethrough, the connection between the pipe 70 and 71 being provided at other times, if desired, through a by-pass line 74 controlled by a valve 75. The line 71 may be provided for reasons to be brought out hereinafter, with a valve 76 between the by-pass 74 and the valve 59 and also with a valve 77 between the by-pass 74 and the connection with the regulator 72. Liquid may also be drawn into the tank 69. If too much liquid accumulates in the vacuum tank 69, the vacuum may be broken by the lifting of a float 69a forming part of a device for this purpose. The liquid may then be drained from the tank 69 through a barometric leg 69b leading to the tank 64 and controlled by a valve 69c.

Let it be assumed that a charge of pulp has been supplied through the pipe 30 and the connection with the pulp mixer has been shut off as by means of the valve 36, that sewage from the tank 40 is being pumped into the trough 31 and that the drum is being turned in the direction of the arrow.

It will be seen that cake formed on the filter as it passes through the tank 32 will be stripped from the filter drum by means including flexible connectors or cords 78 extending around the filter drum and around rolls 79 and 80 and will ordinarily be discharged again into the repulping trough 31 and mixed with additional sewage. For such discharge, the rolls 79 and 80 must be so positioned as to raise the cake higher than the top of the drum in order to be able to drop the cake into the trough. Usually in such a filter, the cake is discharged from the flexible bands at a level below that of the top of the drum. The filter cloth will be substantially clean when it again enters the liquid in the tank and more of the suspended solids will be drawn through the filter cloth than later when a sufficient thickness of cake has formed on the filter drum. Consequently the liquid drawn out through the barometric leg 62 from the first zone and which may be referred to as cloudy filtrate needs to be filtered again and is returned to the supply tank 40. The cake forms so rapidly that, when the vacuum is exerted through the barometric leg 63, the liquid which is drawn into the filter and discharged through the barometric leg 63 is substantially clear.

The charge of pulp supplied to the trough 31 may be made sufficient for use for a predetermined period, such as a day, before the proportion of sewage solids in the mixture becomes sufficiently great to interfere with efficient operation. The final proportions may be substantially 50% of sewage solids and 50% of the paper pulp. It then becomes necessary to remove the mixture of pulp and sewage solids and supply a fresh charge of pulp. To discharge the cake from the apparatus, provision may be made of suitable means such as a shelf or board 81 pivoted at one edge beneath the roll 79 over which the cake passes and is ordinarily dumped into the trough 31. To prevent the return of the cake to the trough 31 the shelf 81 is swung outwardly so as to deflect the cake over the trough 31 and discharge it from the trough 31 and the tank 32. The board 81 may be secured in its inclined position by suitable means including an arm 82 fixed on the tank 32 and having a detachable connection with the shelf.

During the filtering operation it is desirable to keep the cake rather wet inasmuch as it is to be repulped after discharge over the roller 79 and then returned to the tank. When, however, the cake is to be discharged preparatory to the supply of a new charge of pulp, it is desirable to remove more of the water from the pulp so that it can be disposed of more easily. To assure such dewatering or partial drying before discharge, the valve 66 in the barometric leg 63 is closed, the supply of sewage is diminished by partially closing the valve 48, and a greater suction or vacuum is exerted through the barometric leg 62 which for this purpose is connected above a valve 83 to suitable means such as a rotary pump 84 connected through a line 86 with the supply tank 40 and actuated by suitable means such as a motor 85.

It should be understood that during this operation the liquid level in the tank 32 will be lowered. It is therefore necessary in order to effect drawing off the liquid or filtrate through the pipe 62 to adjust the valve 59 in a known manner so that the suction exerted through the line 62 will not become effective on a filter compartment until the compartment passes beneath the lower liquid level. Preferably a valve 86a is provided at the inlet side of the pump and a valve 87 is provided in the line 85. The valve 83 is open during normal operation but is closed when the pump 84 is to be used, and the valve 46a is closed during normal operation and open when the pump is in use. The valve 87 may be closed when desired, for example, when the pump is not in use.

It should be understood that the drying may be effected without diminishing the supply of sewage, as, for example, by increasing the speed of rotation of the filter or by decreasing the speed of rotation of the filter and subjecting the cake to a higher vacuum.

The barometric legs 62 and 63 should be of such effective lengths as to produce a vacuum of from 5 to 10 inches of mercury, preferably about 8 inches. The regulator 72 in the connection for preventing collection of air in the upper part of the valve 59 is set accordingly. In ordinary operation the by-pass line 74 is shut off by the valve 75 and the valves 73 and 77 are open. When, however, the barometric legs 62 and 63 are thrown out of operation by closing the valves 83 and 66 and the pump 84 is brought into use the valves 73 and 77 are closed and the valve 75 is open to enable the maintenance of the higher vacuum established by the pump, namely a vacuum corresponding to substantially 24 inches of mercury. This causes considerable air to be drawn through the cake and a correspondingly rapid drying of the cake. It should be understood that the operation of the valves just described is that which may be followed when filter 33 is in operation for drying purposes.

The cake discharged over the shelf 81 may be disposed of in any suitable manner but as here shown is discharged into a storage hopper 88 from which it is discharged at intervals into a charging hopper 89 at the top of the furnace chamber 90 of an incinerator 91. The bottom of the hopper 89 is normally closed by a suitable sliding door 90a controlled from a handle 90b as by a rack and pinion connection. The cake has been dried to such an extent as to facilitate its destruction in the incinerator leaving only an ash as a by-product in the furnace. From the furnace chamber, the rest of the material, substantially all in gaseous form, passes through a combustion chamber 92, a flue 93 and up a stack 94.

The apparatus thus far described may be considered to form a complete system in itself but preferably is used in connection with one or more additional rotary filters which are operated in the same general manner. The additional filters may or may not be arranged for drying the cake. Preferably the apparatus just described is used with a filter 95 which is not provided with arrangements for drying the cake but is connected with the filter 33 so that the material can readily be transferred, as by gravity, from the filter 95 to the filter 33 and finally discharged into the hopper 88 of the incinerator or disposed of in any other suitable manner.

The filter 95 comprises a tank 32a in which is rotatably mounted a filter drum 56a mounted on a shaft 57a. The shaft 57a is driven from a shaft 54a of a motor 55a by means of a belt 58a passing around pulleys on the two shafts. The shaft 54a may also be utilized to drive a shaft 49a of a rotary beater in a repulping trough 31a at the side of the tank 32a, and for this purpose is provided with a pulley 53a which is connected by belt 52a with a pulley 51a on said shaft 49. The rotary beater may be provided with suitable arms or paddles 50a. At one end of the tank 32a is a rotary suction valve 59a connected by means of a barometric leg 63a with the tank 64, receiving the filtrate or effluent, and with a barometric leg 62a, terminating in the wet well or sewage receiving tank 40.

Pulp is supplied to the repulping trough 31a through a pipe or line 30a connected with the pipe 29 and provided with a valve 36a. Sewage may be supplied to the trough 31a through a pipe 47a connected with the pipe 45a and having a valve 48a. Material from trough 31a may be passed from the trough into the tank 32a through a pipe or line 60a provided with a valve 61a. Preferably the trough 31a and the liquid level therein are relatively high with reference to the tank 32a and the liquid level therein which may be high enough to effect submergence of about 70% of the drum 56a. The pipe 60a is also connected between the trough 31a and the valve 61a with a pipe 96 which is connected at its other end with pipe 47 just below the repulping trough 31 associated with the rotary filter 33. The pipe 96 is provided adjacent to the pipe 47 with a valve 97 and adjacent to the pipe 60a with a valve 98 so that the pipe as a whole can be shut off from both of the filtering units during normal operation. Stripping of cake from the filter drum 56a may be effected in the same general manner as for filter 33 by means of cords or flexible connectors 78a extending around the filter drum 56a and around rollers 79a and 80a.

Presence of air in the upper part of the rotary valve 59a may be guarded against by means of a pipe 71a connected indirectly with the pump 67 and controlled by valve 76a.

When both units illustrated are in use, pulp may be supplied to the trough 31 when the valve 36a is closed and the valve 36 open and may be supplied to the trough 31a when the valve 36a is open and the valve 36 is closed. Of course, pulp may be supplied to both troughs at the same time. Then, when both filters are working, sewage from the tank 40 may be forced by pump 43 through either or both lines 47 and 47a and the operation of both filters kept up in the manner described for filter 33. When the time for removing the pulp and associated sewage solids has been reached, the filter 33 may be cleared as already described and the filter 95 of which the trough 31a is higher than trough 31 of the filter 33, may be cleared by permitting the material in the repulping trough 31a to pass through the pipe 96 to the pipe 47 and into the trough 31. To produce this result the valve 61a must be closed and the valves 97 and 98 must be open. It should be noted that, although the barometric leg 63 is provided with a valve 66 there is no need for a corresponding valve in the line 63a, in that sewage is constantly being supplied during the drawing off of material to the trough 31 and the only effect in the filter 95 is to lower the liquid level in the tank 32a.

In this connection it must be kept in mind that the vacuum in the line 71 connected with the valve 59 must be raised (preferably to about 24 inches of mercury) while the vacuum in the line 71a must be maintained as in the ordinary operation. To produce this effect, the valve 77 must be closed and the valves 73 and 75 open. It may be necessary to keep the lower valve 73 partly closed to make it possible to get the desired vacuum in the line 71.

The cake discharged from the filter 33 contains about 50% of pulp which, particularly when made of paper, has a high calorific value and therefore tends to facilitate the burning, as in an incinerator, of the cake which contains other combustible material.

Instead of destroying the cake, it may be utilized to produce a fertilizer or fertilizer base.

The raw sludge or residue cannot be used for a fertilizer unless it is first humified, but this action may easily be obtained by exposure of the wet cake to mold action. The raw residue will develop a mold in a few days. The cake material stabilized in this way has a substantial nitrogen content and may be used alone as a fertilizer but preferably is used as a base for mixing with more highly concentrated fertilizers.

While shredded and pulped paper is of great value in carrying out the present method, it should be understood that satisfactory filter aids may be obtained by mixing with water or other liquids certain other shredded or pulverized materials.

In referring to cellulose pulp and paper pulp, it should be understood that in such pulp the cellulose and paper materials predominate although there may be substantial amounts of other materials, and that the term paper pulp refers not only to pulp made by breaking down paper but also to pulp containing the same materials whether or not they have ever been made into paper.

It should be understood that various changes may be made and that various features may be used without others without departing from the true scope and spirit of the invention.

Having thus described our invention, we claim:—

1. The method of filtering sewage containing solids, which includes the addition of paper pulp to a sewage stream to form an effective filtering mat on a filter, the passage of the mixture thus made to the filter, the removal of the cake of sewage solids and paper pulp from the filter and the return of the cake in repulped condition to the sewage stream before it reaches the filter.

2. The method of filtering sewage containing solids and liquid, which includes the addition to a sewage stream of cellulose pulp to entrain sewage solids, mixing the pulp material and the sewage before passing the same to a filter, passing the liquid of the sewage through the filter and forming on the filter a cake including the pulp, removing the cake from the filter, repulping cake from the filter and restoring such repulped cake to the sewage flowing to the filter to again form a cake.

3. The method of filtering sewage containing solids, which includes the addition to a stream of sewage before it reaches a vacuum filter of pulp whereby a cake may be formed, removing the cake from the filter, restoring the cake in pulped condition to the sewage stream which is to be filtered, diminishing the supply of sewage after the pulp has been used a plurality of times and increasing the vacuum to partially dry the cake preparatory to disposal thereof.

4. The method of filtering sewage and the like which comprises the addition of a charge of paper pulp or the like to a stream of sewage passing to a vacuum filter, moving the filter to form continuously a cake of pulp and sewage solids, continuously removing the cake, repulping the removed cake with the sewage approaching the filter whereby the pulp will be used a plurality of times, diminishing the supply of sewage to the filter, and dewatering the cake for final disposal by increasing the vacuum.

5. The method of treating sewage consisting of liquid and solids by means of a rotary vacuum filter, which method comprises drawing liquid through the filter at a suitable vacuum and thereby continuously forming a cake of pulpy material and solids on the filter, continuously removing the cake from the filter and adding it to the unfiltered sewage on its way to the filter, diminishing the supply of sewage to the filter but continuing the return of cake to the filter, subjecting the cake thus returned to a higher vacuum, and discharging the resulting cake from the filter.

6. In apparatus of the class described, a vacuum filter including a filter drum and a filter tank in which said filter drum rotates, a collecting tank receiving sewage to be filtered, a tank receiving the filtered sewage, vacuum producing means including a barometric leg to carry off the preliminary cloudy filtrate and deliver it to the collecting tank for refiltration and a barometric leg to carry off final filtrate and discharge it into the tank receiving filtered sewage, means to shut off the barometric leg leading to the filtered sewage tank, and means to increase the vacuum in the zone of filtration connected with the first barometric leg and thereby withdraw a greater than normal percentage of liquid from the cake on the filter.

7. In apparatus of the class described, a vacuum filter including a filter drum and a filter tank in which said filter drum rotates, a collecting tank receiving sewage to be filtered, a tank receiving the filtered sewage, vacuum producing means including a barometric leg to carry off the preliminary cloudy filtrate and deliver it to the collecting tank for refiltration, and a barometric leg to carry off the final filtrate and discharge it into the filtered sewage tank, means to shut off the barometric leg leading to the filtered sewage tank, and means connected with the first barometric leg to increase the vacuum created thereby and thereby withdraw a greater than normal percentage of liquid from the cake on the filter.

8. In apparatus of the class described, a collecting tank receiving sewage to be filtered; a tank receiving the filtered sewage; a rotary filter unit comprising a filter tank and a filter drum therein; a repulping trough adjacent to the filter tank of said unit; means for discharging material from said trough to the filter tank of said unit; means for discharging cake from the filter drum into said trough or out of the apparatus; vacuum means to return cloudy filtrate to the collecting tank and to deliver final filtrate to the filtered sewage tank and adapted to produce a higher vacuum for drying purposes preparatory to discharging cake from the apparatus; an additional rotary filter unit comprising a filter tank and a filter drum therein; a repulping trough adjacent to the tank of the second unit; vacuum means to return cloudy filtrate to the collecting tank and the final filtrate to the filtered sewage receiving tank; means to supply sewage to either one or both of the repulping troughs; means for supplying a charge of pulp to either or both of the repulping troughs, and means for transferring material from the second unit to the first unit for partial drying and discharge from the apparatus.

9. In apparatus of the class described, a plurality of vacuum filters each including a rotary filter drum and a tank, means for supplying sewage mixed with paper pulp to said tanks, means for removing the liquid and continuously forming cake in each of said filters, means for removing the cake from each filter drum and restoring it to the corresponding tank to enable repeated use of the pulp, means for increasing the vacuum on one of said filters to dry cake thereon, and means for transferring, by gravity to the drying filter for drying, wet cake stripped from another filter.

10. In a sewage disposal plant two rotary vacuum filters each including a tank and a drum rotatable therein, means including a barometric leg for each of said drums to produce a vacuum therein, vacuum means connected with each of said filters to prevent the collection of air at the upper ends of the barometric legs, means for shutting off one of said barometric legs from the corresponding filter, means for putting an increased vacuum on such filter, and means to vary for the two filters the vacuum action adapted to keep the barometric legs from becoming disabled.

11. The method of filtering by means of a suction filter sewage containing solids, which includes the addition of pulped paper to assure a suitable cake on the filter under a low vacuum, removing cake containing the pulpy material from the drum and discharging it for repeated use into the source of supply in the supply of sewage and drying cake on the filter by use of a higher vacuum, removing the dried cake from the filter and burning the cake which contains additional calorific value in the form of pulp.

12. The method of treating sewage consisting of liquid and solids by means of a rotary vacuum filter, which method comprises drawing liquid through the filter at a suitable vacuum and thereby continuously forming a cake of pulpy material and solids on the filter, continuously removing the cake from the filter and adding it to the unfiltered sewage on its way to the filter, increasing the speed of rotation of the filter, and discharging the resulting cake from the filter.

13. The method of treating sewage consisting of liquid and solids by means of a rotary vacuum filter, which method comprises drawing liquid through the filter at a suitable vacuum and thereby continuously forming a cake of pulpy material and solids on the filter, continuously removing the cake from the filter and adding it to the unfiltered sewage on its way to the filter, decreasing the speed of rotation of the filter, subjecting the cake to a higher vacuum and discharging the resulting cake from the filter.

14. The method of filtering sewage and the like, which comprises the addition of a charge of cellulose pulp to a stream of sewage passing to a vacuum filter having a rotary filter member, operating the rotary filter member under low vacuum to form continuously a relatively wet cake that may easily be repulped, continuously removing the cake from the rotary filter member, and continuously repulping the removed cake with the sewage in said stream passing to the filter.

15. The method of filtering sewage and the like containing solids, which includes the addition to a sewage stream of paper pulp in requisite amount to assure an effective filter cake, the passing of the mixture thus formed to a filter whereby a cake of paper pulp and sewage solids is formed, the removal of the cake, the repulping of the cake with fresh raw sewage to intermix the sewage solids and the paper pulp to restrict collection of sewage solids at the surface of the cake, and the return of the repulped cake with the sewage to the filter.

16. The method of filtering sewage, which includes the addition of a batch of cellulose pulp to a dilute sewage stream to form an effective filtering mat on a filter, the passage of the mixture thus produced to the filter thereby forming a cake of the cellulose pulp and sewage solids, the repeated removal of the filter cake and the repulping and return thereof to the sewage stream before it reaches the filter, such steps of removal, repulping and return being repeated until the cellulose pulp of said batch is exhausted.

WILLIAM RAISCH.
ARTHUR WRIGHT.